United States Patent [19]

Herb

[11] Patent Number: 4,806,053
[45] Date of Patent: Feb. 21, 1989

[54] EXPANSION DOWEL WITH TWO DIFFERENT EXPANSION MEMBERS

[75] Inventor: Armin Herb, Apfeldorf, Fed. Rep. of Germany

[73] Assignee: Hilti Aktiengesellschaft, Liechtenstein

[21] Appl. No.: 117,230

[22] Filed: Nov. 4, 1987

[30] Foreign Application Priority Data

Nov. 5, 1986 [DE] Fed. Rep. of Germany ....... 3637658

[51] Int. Cl.[4] .............................................. F16D 13/06
[52] U.S. Cl. ........................................ 411/32; 411/57; 411/44; 411/59; 405/259
[58] Field of Search ........................ 411/32, 33, 55, 57, 411/60, 44, 45, 58, 59; 405/259

[56] References Cited

U.S. PATENT DOCUMENTS

| | | | |
|---|---|---|---|
| 2,143,086 | 4/1986 | Pleister | 411/32 |
| 2,972,495 | 2/1961 | Yalen | 411/32 X |
| 3,528,253 | 9/1970 | Kovacs | 411/60 |
| 4,650,384 | 3/1987 | McIntyre et al. | 411/44 |

FOREIGN PATENT DOCUMENTS

| | | | |
|---|---|---|---|
| 609944 | 12/1960 | Canada | 405/259 |
| 0094908 | 11/1983 | European Pat. Off. | 405/259 |
| 2828983 | 1/1980 | Fed. Rep. of Germany. | |
| 3044051 | 6/1982 | Fed. Rep. of Germany | 411/60 |
| 2304813 | 10/1976 | France | 411/33 |
| 2360007 | 3/1978 | France | 411/33 |
| 827276 | 2/1960 | United Kingdom | 405/259 |

Primary Examiner—Lloyd A. Gall
Assistant Examiner—Curtis B. Brueske
Attorney, Agent, or Firm—Toren, McGeady & Associates

[57] ABSTRACT

An expansion dowel assembly includes an axially elongated anchor bolt and a pair of serially arranged expansion elements or shells into which the anchor bolt is drawn. The anchor bolt has axially extending conically shaped expansion members spaced apart in the axial direction and each is arranged to be drawn into a different one of the expansion elements. The expansion member closer to the leading end of the anchor bolt has a larger cone angle than the other expansion member. The expansion elements are interconnected by a web so that the expansion elements are axially displaceable relative to one another. When the anchor bolt with its expansion members is drawn into the expansion elements, initially the trailing expansion element is widened or expanded. Subsequently, after a predetermined axial movement of the leading expansion element toward the trailing expansion element, the widening of the leading expansion element is commenced.

10 Claims, 1 Drawing Sheet

EXPANSION DOWEL WITH TWO DIFFERENT EXPANSION MEMBERS

BACKGROUND OF THE INVENTION

The present invention is directed to an expansion dowel assembly with an axially elongated anchor bolt at least partially cylindrically shaped and shell-shaped expansion elements with means on the anchor bolt for applying a load adjacent its trailing end. Adjacent the leading end of the anchor bolt are two axially extending conically shaped expansion members or cones arranged to move into the expansion elements for widening them. The expansion member closer to the leading end of the anchor bolt has a larger cone angle than the other expansion member. The expansion elements are connected to one another by axially extending webs.

Expansion dowel assemblies with a pair of serially arranged expansion cones are disclosed in DE-OS No. 28 28 983. Such dowel assemblies achieve higher extraction values compared to conventional expansion dowels utilizing a single expansion cone. This difference can be traced to the fact where two expansion members or cones are used, the expansion pressure in the borehole is distributed over a larger surface. In the case of conically shaped expansion members arranged serially in the axially direction, it is assured that at least one of the two expansion elements is expanded in the borehole. In the known expansion dowel assemblies, however, it is a matter of chance as to which of the two expansion elements first comes into contact with the borehole surface.

In the anchoring of this type of dowel assembly there are two different phases. For the initiation of the expanding process, a cone with a slight cone angle of about eight degrees at a maximum is required. Such a slender cone results in large re-expansion travel and a limited expansion force. For an optimum introduction force into the receiving material for the dowel assembly, an expansion member or cone with a cone angle greater than ten degrees is appropriate.

There is another known expansion dowel assembly disclosed in U.S. Pat. No. 4,579,490 with two conically shaped expansion members arranged one behind the other in the axial direction and each with a different cone angle. In this known arrangement, the cone angle of the leading expansion member is larger than that of the adjacent trailing expansion member. The shell-shaped expansion elements are interconnected by a web. With the appropriate matching of the axial spacing between the expansion elements and the expansion members it is assured at the outset that the trailing expansion member expands the trailing expansion element and thus fixes it axially in the receiving material. After a certain amount of travel, the leading expansion element is also expanded by the leading expansion member. Due to the rigid connection of the expansion elements by the web, the expansion of the elements is mutually affected, whereby an inadequate anchoring is achieved.

SUMMARY OF THE INVENTION

Therefore, the primary object of the present invention is to provide an expansion dowel assembly of the above-described type which assures a secure anchorage in the receiving material.

In accordance with the present invention, webs connecting the expansion elements provide for the axial displaceability of the elements relative to one another Due to the limited axial displaceability of the expansion elements relative to one another, it can be assured, initially, that the expansion element with the smaller cone angle is expanded. After a predetermined travel of one expansion element relative to the other based on the axial spacing of the expansion members and the expansion elements, the expansion element in engagement with the expansion member having the larger cone angle is expanded. Because of the connection of the expansion elements affording limited axial displaceability relative to one another, the expansion elements can be widened independently of one another following the initiation of the expanding procedure. Accordingly, it is possible to displace axially the leading expansion element relative to the trailing expansion element after the trailing element has been fixed in the axial direction.

Preferably, the interconnection is provided by the webs. With the interconnection afforded by the webs there is no additional machining costs involved, since the interconnection can be produced in the webs in a single working operation.

During the expansion procedure, the webs can be stressed in tension or compression. To prevent compression stress and premature buckling of the webs, it is advantageous to locate the interconnection at a transitional region of the webs to at least one of the expansion elements. As a result, the webs are not weakened by the interconnection. The interconnecting arrangement located in the transitional region can be accurately dimensioned according to the occurring stresses.

In one embodiment it is appropriate for simple fabrication of the expansion dowel assembly, if the interconnection involves a cross-sectional reduction in the web forming an axial upsetting region. Accordingly, the leading and trailing expansion elements can be connected with one another by the webs to form a single piece. Moreover, additional measures such as bonding, soldering or welding are unnecessary. Preferably, the cross-sectional reduction is located in an axial end region of the webs. The remaining cross-section can be kept quite small, since the webs serve only as spacers for the expansion element. The cross-sectional reduction can be provided during a stamping process of the expansion elements or it can be applied subsequently.

In another preferred embodiment the interconnection is in the form of a slot and insert affording axial play. In this embodiment the webs engage the expansion elements in a hook-like manner at the interconnection. The axial play affords the limited axial displaceability of the expansion element relative to one another. The insert can be provided during the stamping process of the webs or it can be applied or stamped subsequently.

The various features of novelty which characterizes the invention are pointed out with particularity in the claims annexed to and forming a part of this disclosure. For a better understanding of the invention, its operating advantages and specific objectives attained by its use, reference should be had to the drawings and descriptive matter in which there are illustrated and described preferred embodiments of the invention.

DETAILED DESCRIPTION OF THE INVENTION

Figure 1:
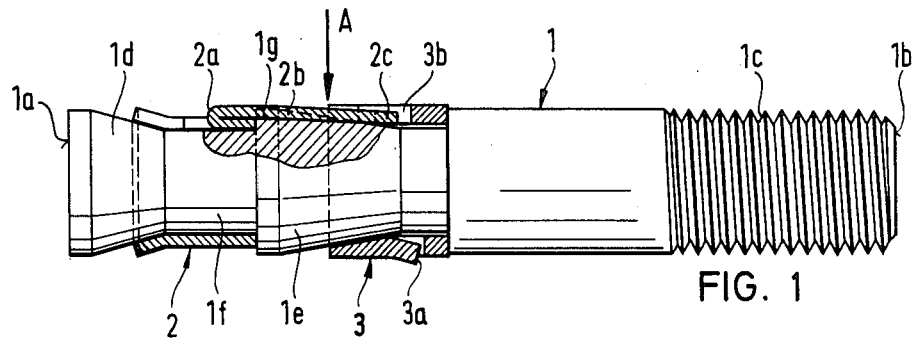
FIG. 1 is an axially extending side view, partly in section, of an expansion dowel assembly embodying the present invention.
Figure 2:
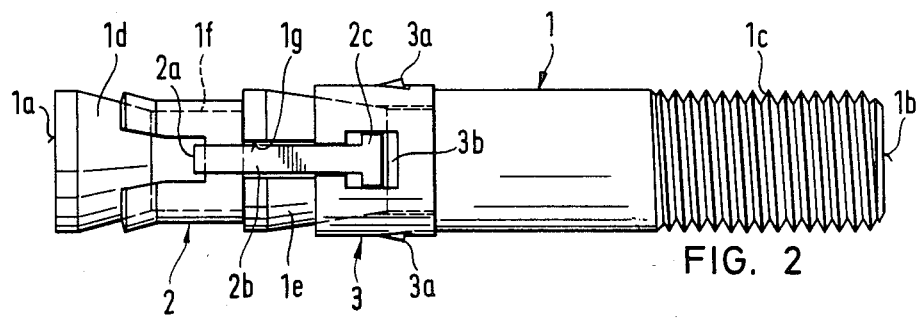
FIG. 2 is another side view of the expansion dowel assembly taken in the direction of the arrow A in FIG. 1.

In FIGS. 1 and 2 an expansion dowel assembly is illustrated made up of an axially extending anchor bolt 1, a leading expansion element 2 and a trailing expansion element 3. As viewed in the drawing the left-hand end is the leading end of the various parts of the assembly, that is, the end inserted first into a borehole in a receiving material in which the expansion dowel assembly is to be secured. Accordingly, anchor bolt 1 has a leading end 1a and a trailing end 1b. Extending from the trailing end 1b of the anchor bolt 1 is an axially extending threaded section 1c. Adjacent its leading end, the anchor bolt 1 has a leading conically shaped expansion member or cone 1d and a trailing conically shaped expansion member 1e spaced toward the trailing end from the leading expansion member. Leading expansion member 1d has a larger cone angle than the trailing expansion member 1e. Between the two expansion members 1d, 1e, there is a cylindrically shaped axially extending section 1f forming a shoulder or stop at the leading end of the trailing expansion member 1e. A web 2b extending in the axial direction of the dowel assembly is connected to the leading expansion element 2 by a creased section 2a. Web 2b extends in an axially extending groove 1g in the trailing expansion member 1e. At the trailing end of the web 2b there is an insert 2c extending transversely of the axial direction so that the insert forms a T-shaped head on the web. Trailing expansion element 3 has outwardly projecting sections 3a which grip into the surface of the borehole while the dowel assembly is being secured and serve for the initiation of the expanding procedure. As can be seen in FIG. 2, the trailing expansion element 3 has a rectangularly shaped recess 3b into which the insert 2c is placed forming a positive locking interconnection between the two expansion elements. Insert 2c is guided within the recess 3b with limited axial displaceability. Accordingly, during the first part of the expanding procedure, the leading expansion element 2 is displaceable axially for a limited amount via the web 2b and the insert 2c relative to the trailing expansion element 3. While the bolt or dowel is being anchored, initially the trailing expansion element 3 is expanded by the trailing expansion member 1e and anchored in the borehole. The expansion of the leading expansion element 2 commences only when the insert 2c rests against the trailing end of the recess 3b.

Figure 3:
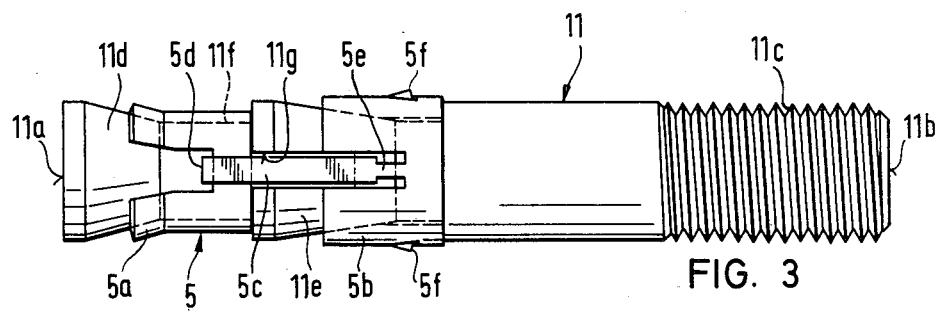
FIG. 3 is another embodiment of the expansion dowel assembly embodying the present invention in axially extending side view similar to FIG. 2.

Anchor bolt 11 displayed in FIG. 3 corresponds to the bolt 1 shown in FIGS. 1 and 2. Anchor bolt 11 has a leading end 11a and a trailing end 11b with an axially extending threaded section 11c extending from the trailing end. Adjacent the leading end 11a is a leading conically shaped expansion member 11d spaced from a trailing conically shaped expansion member 11e with a cylindrically shaped axially extending section 11f between them. The section 11f forms a shoulder 11g at the leading end of the trailing expansion member 11e. Unlike the expansion elements in FIGS. 1 and 2, in FIG. 3 an expansion element 5 is exhibited formed as a single piece or unit and is made up of a leading expansion shell 5a and a trailing expansion shell 5b. The expansion shells 5a, 5b are interconnected by an axially extending web 5c. Web 5c is connected to the leading expansion shell 5a by a creased section 5d. At its trailing end, web 5c has a cross-sectional reduction or narrowed section where it is joined to the trailing expansion element 5d. The cross-sectional reduction 5e serves as an axial upsetting region during the expanding procedure and enables an axial displacement of the leading expansion shell 5a relative to the then fixed trailing expansion shell 5b. To assure the commencement of the expansion procedure, the trailing expansion shell 5b is provided with barb-like outwardly extending projections 5f.

Figure 4:
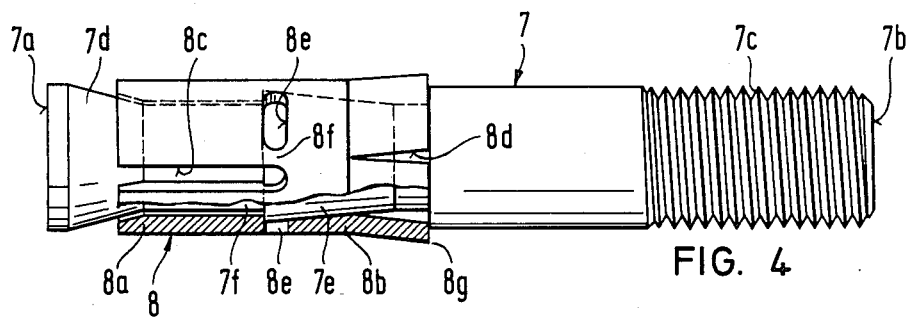
FIG. 4 is a third embodiment of the expansion dowel assembly shown in axial extending side view and partly in section.

In FIG. 4 a third embodiment of the expansion dowel assembly is shown and includes an axially extending anchor bolt 7 and an axially extending expansion sleeve 8. Anchor bolt 7 has a leading end 7a and a trailing end 7b. Extending axially from the trailing end 7b is a threaded section 7c. For effecting the expanding procedure, anchor bolt 7 has a leading conically shaped expansion member or cone 7d and a trailing conically shaped expansion member 7e. The leading expansion member 7d has a larger cone angle than the trailing expansion member 7e. An axially extending cylindrically shaped shank section 7f of the bolt extends between the two expansion members 7d, 7e. Expansion sleeve 8 is formed by a leading expansion sleeve section 8a and a trailing expansion sleeve section 8b. The leading expansion sleeve section 8a has axially extending grooves 8c extending from the leading end toward the trailing end with the trailing end of the grooves located at the leading end of the trailing expansion sleeve section 8b. The trailing expansion sleeve section 8b has longitudially extending slots 8d extending from its trailing end toward and spaced from the trailing ends of the grooves or slots 8c. Circumferentially extending slots 8e are located at the trailing end of the leading expansion sleeve section 8a and the leading end of the trailing expansion sleeve section 8b. The slots 8e extend transversely of the grooves or slots 8c and webs 8f remain between the individual circumferential slots 8e and the axially extending grooves or slots 8c and form an axial upsetting region during the expanding procedure. Radially outwardly extending projections 8g are formed by the slots 8d so that the expansion sleeve 8 grips into the surface of the borehole during the dowel placement procedure. When the dowel is being placed, initially the trailing expansion sleeve section 8b is widened and anchored in a borehole. Subsequently, the leading expansion sleeve section 8e is expanded by the leading expansion member 7d of the anchor bolt 7 with possible axial upsetting of the webs 8f.

While specific embodiments of the invention have been shown and described in detail to illustrate the application of the inventive principles, it will be understood that the invention may be embodied otherwise without departing from such principles.

I claim:

1. An expansion dowel assembly including shell-shaped expansion elements and an axially elongated partially cylindrically shaped anchor bolt, said anchor bolt having a leading end and a trailing end spaced axially from the leading end and said leading end being insertable first into a borehole, means on said anchor bolt adjacent the trailing end for applying a load to the anchor bolt, said anchor bolt having an axially extending leading end section extending from the leading end toward the trailing end and having two serially arranged axially extending conically shaped expansion members each widening toward the leading end, said expansion members comprise a leading expansion member closer to the leading end and a trailing expansion member more remote from the leading end, said expansion elements comprise a leading expansion element arranged to receive said leading expansion member and a trailing expansion element arranged to receive said trailing expansion member, said leading and trailing expansion members having different cone angles with the cone angle of said leading expansion member being greater than the cone angle of said trailing expansion member, axially extending web means interconnecting said leading and trailing expansion elements, wherein the improvement comprises interconnecting means allowing axial displacement of said leading expansion element relative to said trailing expansion element when said anchor bolt is drawn in the axial direction into said expansion elements.

2. An expansion dowel assembly, as set forth in claim 1, wherein said interconnection means is formed as a part of said web means.

3. An expansion dowel assembly, as set forth in claim 1 or 2, wherein said web means have a transitional region adjacent the connection of said web means to at least one of said leading and trailing expansion elements.

4. An expansion dowel assembly, as set forth in claim 1 or 2, wherein said web means includes axially extending webs connected at one end to said leading expansion element and at the other end by a reduced cross-sectional section to said trailing expansion element so that said reduced cross-sectional section forms an axial upsetting region adjacent said trailing expansion element.

5. An expansion dowel assembly, as set forth in claim 1 or 2, wherein said web means comprises an axially extending web secured to said leading expansion element and having an end in the axial extending region of said trailing expansion element, said end of said web having an insert extending transversely of the axial direction, said trailing expansion element having a groove therein extending in the axial direction of said anchor bolt, and said insert axially displaceably secured within said groove so that said leading expansion element is axially displaceable relative to said trailing expansion element at the commencement of the expanding procedure.

6. An expansion dowel assembly, as set forth in claim 1 or 2, wherein said leading expansion element and trailing expansion element form a unitary axially extending expansion sleeve, an axially extending slot located in said leading expansion element extending from the leading end of said leading expansion element to a transition between said leading expansion element and trailing expansion element, a circumferential slot extending transversely of the axial direction adjacent the trailing end of said axially extending slot with a web extending between said circumferentially extending slot and the trailing end of said axially extending slot whereby said web forms an upsetting region in said expansion sleeve for affording axial displacement of said leading expansion element relative to said trailing expansion element.

7. An expansion dowel assembly, as set forth in claim 6, wherein said trailing expansion element has an axially extending slot therein extending from the trailing end thereof toward and spaced from the trailing end of said axially extending slot in said leading expansion element.

8. An expansion dowel assembly, as set forth in claim 1 or 2, wherein said leading expansion member is spaced axially from said trailing expansion member by a cylindrically shaped shank section.

9. An expansion dowel assembly, as set forth in claim 1 or 2, wherein outwardly extending projections are formed on said trailing expansion elements for effecting a gripping action with the borehole surface when the expansion dowel assembly is being placed.

10. An expansion dowel assembly, as set forth in claim 1, wherein said web means comprises an axially extending web secured to said leading expansion element by a creased section.

* * * * *